(12) United States Patent  
Maslyn et al.

(10) Patent No.: US 9,178,233 B2
(45) Date of Patent: Nov. 3, 2015

(54) SMART IN-VEHICLE REACTIVE RECOVERY STRATEGY

(75) Inventors: Andrew J. Maslyn, Rochester, NY (US); Puneet K. Sinha, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1060 days.

(21) Appl. No.: 13/155,047

(22) Filed: Jun. 7, 2011

(65) Prior Publication Data

US 2012/0315561 A1 Dec. 13, 2012

(51) Int. Cl.
*H01M 8/04* (2006.01)

(52) U.S. Cl.
CPC ............ *H01M 8/04559* (2013.01); *Y02E 60/50* (2013.01)

(58) Field of Classification Search
CPC ....................................................... H01M 8/04
USPC ................................................................ 429/432
See application file for complete search history.

(56) References Cited

U.S. PATENT DOCUMENTS

| 8,288,043 | B2 | 10/2012 | Manabe et al. |
| 2011/0091781 | A1 | 4/2011 | Folmsbee |
| 2011/0177414 | A1 | 7/2011 | Umeda et al. |

*Primary Examiner* — Gary Harris
(74) *Attorney, Agent, or Firm* — John A. Miller; Miller IP Group, PLC

(57) ABSTRACT

A method for determining when to operate a voltage recovery process for recovering a reversible voltage loss of a fuel cell stack in a fuel cell system. The method includes estimating an irreversible voltage loss of the fuel cell and an actual voltage of the fuel cell stack, and determining whether a difference between the estimated irreversible voltage loss and the estimated actual voltage exceed a threshold, and if so, the voltage recovery process is performed.

20 Claims, 2 Drawing Sheets

SMART IN-VEHICLE REACTIVE RECOVERY STRATEGY

BACKGROUND OF THE INVENTION

1. Field of the Invention

This invention relates generally to a system and method for determining when to operate a voltage recovery algorithm for recovering a reversible voltage loss of a fuel cell stack in a fuel cell system and, more particularly, to a system and method for determining when to operate a voltage recovery algorithm for recovering a reversible voltage loss of a fuel cell stack in a fuel cell system, where the method determines whether a difference between an irreversible voltage loss and an actual stack voltage is greater than a predetermined value.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

There are a number of mechanisms that occur during the operation of a fuel cell system that cause permanent loss of stack voltage and performance, such as loss of catalyst activity, catalyst support corrosion and pinhole formation in the cell membranes. However, there are other mechanisms that can cause stack voltage loss that are substantially reversible, such as the cell membranes drying out, catalyst oxide formation, and contaminants depositing on both the anode and cathode side of the stack.

In order for a PEM fuel cell system to be commercially viable, there generally needs to be a limitation of the noble metal loading, i.e., platinum or platinum alloy catalyst, on the fuel cell electrodes to reduce the overall system cost. As a result, the total available electro-chemically active surface area of the catalyst may be limited or reduced, which renders the electrodes more susceptible to contamination. The source of the contamination that may cause stack voltage loss can be from the anode and cathode reactant gas feed streams including humidification water, or generated within the fuel cells due to the degradation of the MEA, stack sealants and/or bipolar plates. One particular type of contaminate includes anions, which are negatively charged, such as chlorine or sulfates, such as $SO_4^{2-}$. The anions tend to adsorb onto the platinum catalyst surface of the electrode during normal fuel cell operation when the cathode potential is typically over 650 mV, thus blocking the active site for oxygen reduction reaction, which leads to cell voltage loss. Moreover, if proton conductivity is also highly dependent on contaminate free platinum surface, such as nano-structured thin film (NSTF) type electrodes, additional losses are caused by the reduced proton conductivity.

U.S. patent application Ser. No. 13/094,300, titled, In-Vehicle Algorithm for Fuel Cell Stack Health Quantification, filed Apr. 26, 2011, assigned to the assignee of this application and herein incorporated by reference, discloses a method for determining the health of fuel cells in a fuel cell stack that includes determining a remaining catalyst surface area and catalyst support area of the catalyst layers in the fuel cells in a fuel cell stack, which can be used to estimate stack voltage. The method includes determining a total parasitic current of the fuel cell stack to determine a cross-over parasitic current and a shorting resistance of the fuel cell stack to determine the catalyst surface area. By knowing the catalyst surface area, the amount of voltage that the stack should be providing can be determined.

SUMMARY OF THE INVENTION

In accordance with the teachings of the present invention, a system and method are disclosed for determining when to operate a voltage recovery process for recovering a reversible voltage loss of a fuel cell stack in a fuel cell system. The method includes estimating an irreversible voltage loss of the fuel cell and an actual voltage of the fuel cell stack, and determining whether a difference between the estimated irreversible voltage loss and the estimated actual voltage exceed a threshold, and if so, the voltage recovery process is performed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining when to operate a voltage recovery algorithm for recovering a reversible voltage loss of a fuel cell stack in a fuel cell system is merely exemplary in nature, and is in no way intended to limit the invention or its applications or uses.

Figure 1:
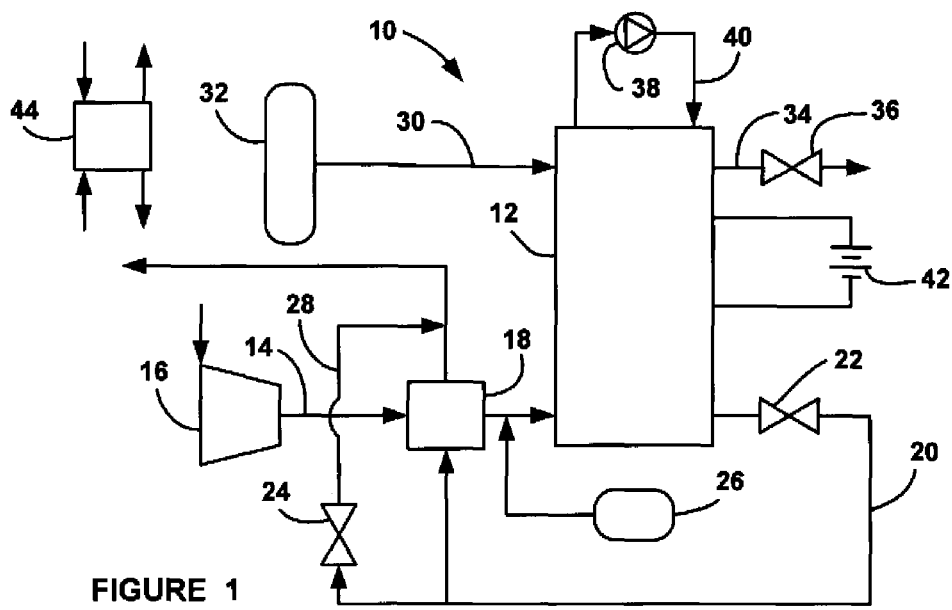
FIG. 1 is a schematic block diagram of a fuel cell system.

FIG. 1 is a schematic block diagram of a fuel cell system 10 including a fuel cell stack 12, where the system 10 is able to provide the stack operating conditions for cell voltage loss recovery referred to below. A compressor 16 provides an airflow to the cathode side of the fuel cell stack 12 on a cathode input line 14 through a water vapor transfer (WVT) unit 18 that humidifies the cathode input air. The WVT unit 18 is one type of applicable humidification device, where other types of humidification devices may be applicable for humidifying the cathode inlet air, such as enthalpy wheels, evaporators, etc. A cathode exhaust gas is output from the stack 12 on a cathode exhaust gas line 20 through a back-pressure valve 22. The exhaust gas line 20 directs the cathode exhaust to the WVT unit 18 to provide the humidity to humidify the cathode input air. A by-pass line 28 is provided around the WVT unit 18 to direct some or all of the cathode exhaust gas around the WVT unit 18 in a controlled manner. In an alternate embodiment, the by-pass line 28 can be an inlet by-pass. A by-pass valve 24 is provided in the by-pass line 28 and is controlled to selectively redirect the cathode exhaust gas through or around the WVT unit 18 to provide the desired amount of humidity to the cathode input air. A nitrogen source 26 is also included to provide nitrogen gas to the cathode side of the stack 12.

The anode side of the fuel cell stack 12 receives hydrogen gas from a hydrogen source 32 on an anode input line 30 and provides an anode exhaust gas on line 34 through a valve 36, such as a bleed valve, purge valve, etc. A pump 38 pumps a cooling fluid through the stack 12 and a coolant loop 40 external to the stack 12. A power source 42, such as a battery, is included to provide a current flow through the stack 12. A controller 44 receives data from the stack 12 and performs the algorithms described below.

Figure 2:
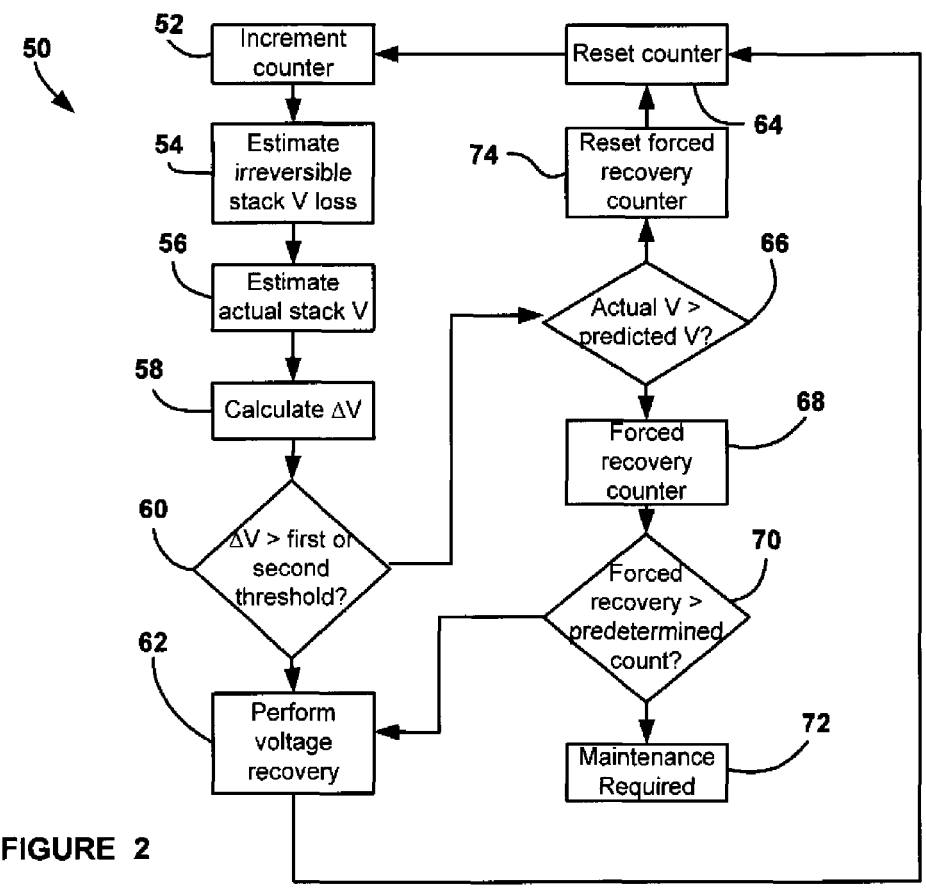
FIG. 2 is a flow chart diagram showing an operation for determining when to run a voltage recovery algorithm for recovering a reversible voltage loss of the fuel cell stack in the fuel cell system shown in FIG. 1.

FIG. 2 is a flow chart diagram 50 showing a process for operating a voltage recovery determination algorithm that determines if and when to operate a voltage recovery algorithm that attempts to recapture a reversible voltage loss of the fuel cell stack 12 as the stack 12 ages over its life. The algorithm increments an algorithm determination counter while the vehicle is in a key on state at box 52, which prevents the determination algorithm from always running, but causes the determination algorithm to be operated at every certain time interval, which is application specific, and could be, for example, every hour of vehicle operation. The counter will increase when the vehicle is in the key on state, whether or not the vehicle is actually moving, and will hold that time when the vehicle is keyed off to be incremented the next time the vehicle is keyed on.

Once the counter reaches the predetermined time interval, the algorithm then moves to box 54 to estimate an irreversible stack voltage loss $V_{irr}$. Those skilled in the art would recognize various techniques for determining the stack irreversible voltage loss $V_{irr}$ by determining what voltage the stack 12 is capable of producing. In one embodiment, the irreversible voltage loss $V_{irr}$ is based on an in-situ measured voltage loss based on the remaining catalyst in the fuel cells, as discussed above for the '300 application, although other techniques for determining the irreversible voltage loss $V_{irr}$ may be equally applicable.

Once the algorithm estimates the irreversible voltage loss $V_{irr}$, the algorithm then moves to box 56 to estimate an actual stack voltage $V_{act}$. Those skilled in the art would recognize various techniques for determining the estimated actual stack voltage $V_{act}$ of the fuel cell stack 12 at a particular stack current density. One applicable technique used in the art is to determine a polarization curve of the fuel cell stack 12, which is a relationship between the stack current and stack voltage. United States Patent Application Publication No. 2008/0182139, published Jul. 31, 2008, title Algorithm for On-Line Adaptive Polarization Curve Estimation of a Fuel Cell Stack, discloses one technique for determining a stack voltage using a polarization curve, assigned to the assignee of this application and herein incorporated by reference.

Many control parameters for a fuel cell system require knowledge of the polarization curve of the fuel cell stack 12, such as knowing the maximum voltage potential and current draw available from the fuel cell stack 12. As the stack 12 ages, the stack polarization curve also changes as a result of stack degradation. The algorithm of the '139 application estimates two or more stack parameters from collected data as the stack 12 is being operated, and uses the parameters to calculate the polarization curve using the equation:

$$E_{cell} = E_{rev} - (j+a) * R_{HFR} - \left(0.07 * \log_{10}\left(\frac{j+a}{j^0}\right) + c\, \log_{10}\left(1 - \frac{j}{j^\infty}\right)\right)$$

Where $E_{cell}$ is the cell voltage (V), j is the current density (A/cm$^2$), $R_{HFR}$ is the cell HFR resistance (ohm cm$^2$), $E_{rev}$ is the thermodynamic reversible cell potential (V), a is the background current density from cell shorting/cell crossover (A/cm$^2$), $j^0$ is the exchange current density (A/cm$^2$), $j^\infty$ is the limiting current density (A/cm$^2$), and c is the mass transfer coefficient.

Once the determination algorithm has estimated the irreversible voltage loss $V_{irr}$ and the estimated actual stack voltage $V_{act}$, it calculates a voltage delta $\Delta V$ that is the difference between the voltages $V_{irr}$ and $V_{act}$ at box 58. The voltage delta $\Delta V$ is a representation of how much voltage the fuel cell stack 12 is able to produce, but is not being produced, which should be recoverable by a voltage recovery technique. In other words, the voltage delta $\Delta V$ is a representation of the reversible voltage loss of the fuel cell stack 12.

The determination algorithm then determines whether the voltage delta $\Delta V$ is greater than a predetermined threshold voltage at box 60. In one non-limiting embodiment, the determination algorithm determines whether the voltage delta $\Delta V$ is greater than a first voltage threshold at 100% stack power or is greater than a second voltage threshold at 25% stack power. The first and second voltage thresholds would be application specific for a particular vehicle and fuel cell system and can be, for example, 20 mV for the first voltage threshold, where the second voltage threshold would typically be slightly less, although the two values can be the same. The estimated irreversible voltage loss $V_{irr}$ and the estimated actual voltage $V_{act}$ are determined for the range of possible stack current densities based on the polarization curve estimation models. Therefore, an irreversible voltage loss $V_{irr}$ and an estimated actual voltage $V_{act}$ can be given for every stack current density, which thus gives a voltage delta $\Delta V$ for each stack current density data point. Polarization curve models are well known to those skilled in the art that give extraction for data points outside the operating range and interpolation between data points.

If either of these criteria are met at the specific stack power for the voltage delta $\Delta V$, then the determination algorithm causes a voltage recovery algorithm to be performed at box 62. Those skilled in the art will recognize various techniques for recovering voltage loss in a fuel cell stack. One non-limiting example can be found in U.S. patent application Ser. No. 12/939,867, titled Methods and Processes to Recover Voltage Loss of PEM Fuel Cell Stack, filed Nov. 4, 2010, assigned to the assignee of this application and herein incorporated by reference. In the '867 application, two techniques are described that both operate the fuel cell stack at a relatively low temperature and a cathode inlet relative humidity (RH) above the cathode exhaust saturation level. The first technique also includes providing hydrogen to the anode side in the stack 12 and air to the cathode side of the stack 12, and operating the stack at a relatively low voltage. The second technique includes flowing hydrogen to the anode side of the stack and nitrogen to the cathode side of the stack 12, such as from the source 26, using an external power source, such as the power source 42, to provide a stack current density, and providing an anode humidity level that is significantly higher than the cathode humidity level. Other techniques for recovering stack voltage loss are also known by those skilled in the art. In theory, the voltage recovery algorithm should recover all or most of the reversible voltage that has been lost so that the irreversible voltage loss $V_{irr}$ and the estimated actual stack voltage $V_{act}$ are nearly the same. However, in a practical world, the voltage recovery algorithm will have limitations to recover all of the reversible voltage loss.

Once the voltage recovery has been performed, the algorithm then moves to box 64 to reset the counter to zero, and proceeds to the box 52 to wait for the next time that the counter is greater than the predetermined count.

If the algorithm determines that the voltage delta $\Delta V$ at 100% power level or the efficiency power level of 25% of stack power is not greater than the voltage threshold at the decision diamond 60, then the determination algorithm goes through another operation that determines whether the actual stack voltage $V_{act}$ is a predicted stack voltage at the end of life of the fuel cell stack 12 at decision diamond 66. Particularly, in one embodiment, the determination algorithm determines whether the estimated actual voltage $V_{act}$ at 100% stack power is less than the stack voltage at 100% power that would occur for the end of life (EoL) of the stack 12, which can be estimated or predicted. The estimated actual voltage $V_{act}$ at 100% stack power needs to be at least some minimum level, where if the actual stack voltage $V_{act}$ is unable to meet that minimum level, then the stack 12 is at its end of life and needs to be replaced.

If the estimated actual voltage $V_{act}$ at 100% stack power is less than the desired end of life voltage at the decision diamond 66, then the algorithm adds a forced recovery count to a forced recovery counter at box 68. Each time the forced recovery count is increased, the algorithm determines whether the forced recovery count is greater than some predetermined count at decision diamond 70, and if not, the voltage recovery algorithm is performed at the box 62 so that a forced voltage recovery process is performed even though the voltage delta $\Delta V$ is not greater than the threshold voltage. If the forced recovery count exceeds the predetermined count at the decision diamond 70, then the voltage recovery process is not helping enough and the algorithm notifies the vehicle operator that maintenance is required at box 72. If the estimated actual voltage $V_{act}$ at the maximum stack power is greater than the end of life voltage at the decision diamond 66, then the algorithm proceeds to box 74 where it sets the forced recovery counter to zero, and then proceeds to the box 64 to set the recovery algorithm counter to zero.

By looking at the voltage delta $\Delta V$ as the recovery voltage based on the operating conditions of the vehicle, the voltage recovery algorithm is adaptable to different drivers that may drive the vehicle differently. For example, drivers that tend to go to maximum stack power often and cause high voltage transients, may require voltage recovery more often.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to perform a stack voltage recovery process, said method comprising:
providing a fuel cell stack in a fuel cell system, said fuel cell stack including at least one anode side and at least one cathode side, with a membrane-electrode assembly between each of the at least one anode side and the at least one cathode side;
providing a water vapor transfer unit in a cathode input line of the fuel cell stack, said water vapor transfer unit being capable of humidifying cathode input air;
a controller that is programmed with algorithms for:
providing an estimate of an irreversible voltage loss of the fuel cell stack by determining a voltage that the stack is capable of producing;
providing an estimate of an actual voltage of the fuel cell stack at a stack current density;
determining a difference between the irreversible voltage loss and the actual voltage;
determining whether the difference between the irreversible voltage loss and the actual voltage is greater than a predetermined voltage threshold;

performing the stack voltage recovery process when the difference between the irreversible voltage loss and the actual voltage loss is greater than the predetermined voltage threshold; and resetting a counter to zero once the stack voltage recovery process is complete.

2. The method according to claim 1 wherein providing an estimate of the irreversible voltage loss, providing an estimate of the actual voltage and determining a difference between the irreversible voltage loss and the actual voltage includes providing an estimate of the irreversible voltage loss, providing an estimation of the actual voltage and determining the difference between the estimated irreversible voltage loss and the actual voltage over a current density output range of the fuel cell stack.

3. The method according to claim 2 wherein providing an estimate of the actual voltage of the fuel cell stack includes using a polarization curve that identifies a relationship between the stack voltage and stack current density.

4. The method according to claim 1 wherein determining whether the difference between the irreversible voltage loss and the actual voltage is greater than a predetermined voltage threshold includes determining whether the difference between the irreversible voltage loss and the actual voltage at 100% stack power is greater than a first predetermined voltage threshold and determining whether the difference between the irreversible voltage loss and the actual voltage at 25% stack power is greater than a second predetermined voltage threshold.

5. The method according to claim 4 wherein the first and second predetermined voltage thresholds are different and the first predetermined voltage threshold is greater than the second predetermined voltage threshold.

6. The method according to claim 1 further comprising determining whether the estimated actual voltage at 100% stack power is less than a predetermined stack end of life voltage if the difference between the irreversible voltage loss and the actual voltage is not greater than the predetermined voltage threshold.

7. The method according to claim 6 further comprising causing the stack voltage recovery process to be performed if the estimated actual stack voltage is less than the predetermined end of life voltage at 100% stack power.

8. The method according to claim 7 further comprising incrementing a forced voltage recovery counter each time the stack voltage recovery process is performed if the estimated actual stack voltage is less than the predetermined end of life voltage, and setting a maintenance flag if the forced recovery counter reaches a predetermined count.

9. The method according to claim 1 further comprising periodically incrementing a recovery counter when the system is in an on state, and only performing the method for determining when to perform the stack voltage recovery process when the recovery counter reaches a predetermined count.

10. A method for determining when to perform a stack voltage recovery process, said method comprising:

providing a fuel cell stack in a fuel cell system, said fuel cell stack including at least one anode side and at least one cathode side, with a membrane-electrode-assembly between each of the at least one anode side and the at least one cathode side;

providing a water vapor transfer unit in a cathode input line of the fuel cell stack, said water vapor transfer unit being capable of humidifying cathode input air;

a controller that is programmed with algorithms for:

providing an estimate of an irreversible voltage loss of the fuel cell stack by determining a voltage that the stack is capable of producing;

providing an estimate of an actual voltage of the fuel cell stack at a current density;

determining a difference between the irreversible voltage loss and the actual voltage, wherein providing an estimate of the irreversible voltage loss, providing an estimate of the actual voltage and determining a difference between the irreversible voltage loss and the actual voltage are performed over a current density output range of the fuel cell stack;

determining whether the difference between the irreversible voltage loss and the actual voltage is greater than a first predetermined voltage threshold at 100% stack power and a second predetermined voltage threshold at about 25% stack power;

performing the stack voltage recovery process when the difference between the irreversible voltage loss and the actual voltage loss is greater than either the first or second predetermined voltage thresholds at 100% stack power and 25% stack power;

determining whether the estimated actual voltage at 100% stack power is less than a predetermined stack end of life voltage when the difference between the irreversible voltage loss and the actual voltage is not greater than either the first or second predetermined voltage threshold; and performing the stack voltage recovery process when the estimated actual voltage at 100% stack power is less than the predetermined stack end of life voltage.

11. The method according to claim 10 wherein providing an estimate of the actual voltage of the fuel cell stack includes using a polarization curve that identifies a relationship between the stack voltage and stack current density.

12. The method according to claim 10 wherein the first and second predetermined voltage thresholds are different and the first predetermined voltage threshold is greater than the second predetermined voltage threshold.

13. The method according to claim 10 further comprising incrementing a forced voltage recovery counter each time the stack voltage recovery process is performed if the estimated actual stack voltage is less than the predetermined end of life voltage, and setting a maintenance flag if the forced recovery counter reaches a predetermined count.

14. The method according to claim 10 further comprising periodically incrementing a recovery counter when the system is in an on state, and only performing the method for determining when to perform the stack voltage recovery process when the recovery counter reaches a predetermined count.

15. A recovery system for determining when to perform a stack voltage recovery process, said recovery system comprising:

a fuel cell stack in a fuel cell system, said fuel cell stack including at least one anode side and at least one cathode side, with a membrane-electrode-assembly between each of the at least one anode side and the at least one cathode side;

a water vapor transfer unit in a cathode input line of the fuel cell stack, said water vapor transfer unit capable of humidifying cathode input air;

a controller that is programmed with algorithms that provide:

means for providing an estimate of an irreversible voltage loss of the fuel cell stack by determining a voltage that the stack is capable of producing;

means for providing an estimate of an actual voltage of the fuel cell stack at a stack current density;

means for determining a difference between the irreversible voltage loss and the actual voltage;

means for determining whether the difference between the irreversible voltage loss and the actual voltage is greater than a predetermined voltage threshold; and means for performing the stack voltage recovery process when the difference between the irreversible voltage loss at the actual voltage loss is greater than the predetermined voltage threshold.

16. The recovery system according to claim 15 wherein the means for providing an estimate of the irreversible voltage loss, the means for providing an estimate of the actual voltage and the means for determining a difference between the irreversible voltage loss and the actual voltage provide an estimate of the irreversible voltage loss, provide an estimate of the actual voltage and provide the difference between the estimated irreversible voltage loss and the actual voltage over a current density output range of the fuel cell stack.

17. The recovery system according to claim 15 wherein the means for determining whether the difference between the irreversible voltage loss and the actual voltage is greater than a predetermined voltage threshold determines whether the difference between the irreversible voltage loss and the actual voltage at 100% stack power is greater than a first predetermined voltage threshold and determines whether the difference between the irreversible voltage loss and the actual voltage at 25% stack power is greater than a second predetermined voltage threshold.

18. The recovery system according to claim 15 further comprising means for determining whether the estimated actual voltage at 100% stack power is less than a predetermined stack end of life voltage if the difference between the irreversible voltage loss and the actual voltage is not greater than the predetermined voltage threshold and means for causing the stack voltage recovery process to be performed if the estimated actual stack voltage is less than the predetermined end of life voltage at 100% stack power.

19. The recovery system according to claim 18 further comprising means for incrementing a forced recovery counter each time the stack voltage recovery process is performed if the estimated actual stack voltage is less than the predetermined end of life voltage, and means for setting a maintenance flag if the forced recovery counter reaches a predetermined count.

20. The recovery system according to claim 15 further comprising means for periodically incrementing a recovery counter when the system is in an on state, wherein the stack voltage recovery process is only performed when the recovery counter reaches a predetermined count.

* * * * *